(No Model.)

J. COSTELLO & J. M. AKER.
SLED BRAKE.

No. 347,322. Patented Aug. 17, 1886.

Witnesses
Susie R. Seiler
Sarepta Specht

Inventor
John Costello
Joseph M. Aker
By their Attorneys
R. S. & A. P. Lacey

UNITED STATES PATENT OFFICE.

JOHN COSTELLO, OF WABASHA, AND JOSEPH M. AKER, OF REED'S LANDING, MINNESOTA.

SLED-BRAKE.

SPECIFICATION forming part of Letters Patent No. 347,322, dated August 17, 1886.

Application filed May 28, 1886. Serial No. 203,540. (No model.)

*To all whom it may concern:*

Be it known that we, JOHN COSTELLO and JOSEPH M. AKER, citizens of the United States, residing at Wabasha and Reed's Landing, respectively, in the county of Wabasha and State of Minnesota, have invented certain new and useful Improvements in Sled-Brakes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to sleds, and particularly to the means employed in connection therewith for preventing it running up on the animal when going downgrade, the object being to simplify and improve the construction of such means, whereby the cost of the sled will not be materially increased and the means themselves be easy to manage, simple and compact in arrangement, economical in cost, and not liable to get out of repair.

It consists in the novel construction hereinafter set forth, claimed, and shown in the annexed drawings, in which—

Figure 1:
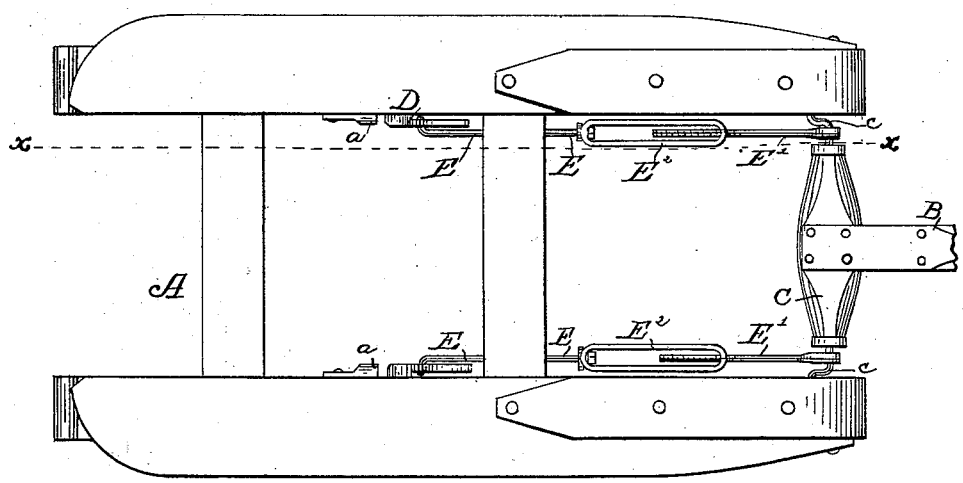
Figure 2:
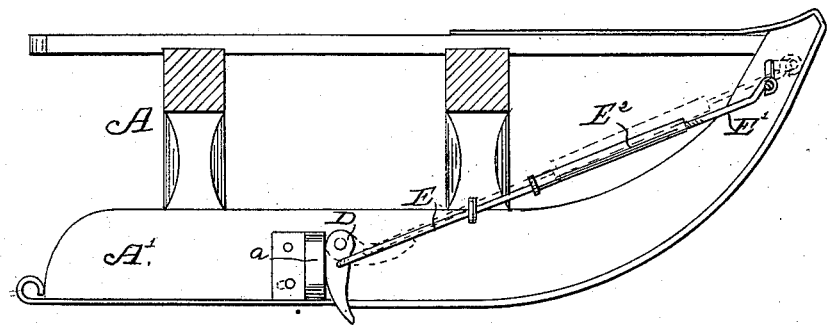
Figure 3:
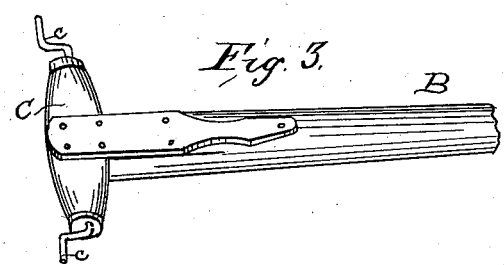

Figure 1 is a plan view of a sled of our construction provided with our improvements. Fig. 2 is a section on the line *x x* of Fig. 1. Fig. 3 is a detail perspective view of the inner end of the pole.

The sled A is of the usual construction, and is provided with a pole or tongue, B, supported by a cross head or bar, C, and cranks *c* between the front ends of the runners A'. The cross-head is rigidly fastened to the end of the pole, and the arms of the cranks are loosely journaled in the runners and in the ends of the cross head or bar, to permit a partial rotary movement of the crank-arms within their bearings as the pole is moved to and fro when going over hilly ground, caused by the sled running upon the animal when going downgrade, and the application of force to overcome its resistance when riding up grades or on level ground.

On the sides of the runners, preferably the inner sides, at a point between their ends, catches D are pivoted. The lower ends of these catches curve forward, and are adapted to project a proper distance below the runners, to engage the surface and form a lock and prevent the sled running up on the animal when going downgrade.

To release the catches from the surface when the draft is applied, adjustable connections are interposed between them and the crank-arms entering the cross-head of the pole, consisting of the rods E E' and the adjustable link E². One end of the rods E' is threaded and enters a corresponding threaded end of the links. The corresponding ends of the rods E may or may not be connected with the opposite ends of the links in a similar manner; but for simplicity it has been found sufficient to project the ends of the rods through the link and provide them with stops on each side of the end bar thereof, so as to prevent any longitudinal movement, but yet permit the link to be rotated when adjusting the length of the connection between the catches and crank-arms, as when taking up wear or limiting the backward movement of the catches to regulate the amount of bite into the surface, and shortening said connections, so as to throw the catches entirely within the plane of the runners when desired, as when going over smooth or level surfaces.

Stops *a*, located back of the catches, remove the strain from off the connections, and in order to provide a rest for the catches when adjusted to project different distances below the runners blocks of wood may be interposed between the stops and the catches; or the stops may be adjusted by providing them with slots, and having bolts passing through the slots, as indicated by dotted lines.

Having thus described our invention, what we claim, and desire to secure by Letters Patent, is—

1. The combination, in a sled, of a tongue having a cross-head, cranks supporting the cross-head between the runners, catches pivoted to the runners, and connections between the catches and cranks, consisting of the rods E E' and the links E², adjustably connecting the proximate ends of the rods, substantially as and for the purpose specified.

2. The combination, in a sled, of a pole having a cross-head, cranks supporting the cross-head between the runners, catches pivoted on the runners, adjustable connections intermediate the catches and cranks, and stops for the catches adjustably connected to the runners, substantially as described, and for the purpose specified.

In testimony whereof we affix our signatures in presence of two witnesses.

JOHN COSTELLO.
JOSEPH M. AKER.

Witnesses:
CHAS. GENGNAGEL,
W. H. CHADWICK.